United States Patent [19]
Bouanaka et al.

[11] Patent Number: 5,948,071
[45] Date of Patent: Sep. 7, 1999

[54] SYSTEM CONVERTING A REQUEST MESSAGE USING COMPUTER PROTOCOL TO TELEPHONE COMMUNICATION PROTOCOL FOR ACCESSING TELEPHONE DIRECTORY ASSISTANCE INFORMATION WITHOUT ASSISTANCE FROM AN OPERATOR

[75] Inventors: Hansali Bouanaka, Tinton Falls; Moshiur Rahman, Freehold, both of N.J.

[73] Assignee: AT&T Corp., New York, N.Y.

[21] Appl. No.: 08/928,079

[22] Filed: Sep. 12, 1997

[51] Int. Cl.⁶ ............................................. G06F 13/00
[52] U.S. Cl. ........................... 709/246; 709/218; 709/219
[58] Field of Search ............................ 709/246, 218, 709/219

[56] References Cited

U.S. PATENT DOCUMENTS

| | | | |
|---|---|---|---|
| 4,817,129 | 3/1989 | Riskin | 379/88 |
| 5,740,230 | 4/1998 | Vaudreuil | 379/88 |

Primary Examiner—Le Hien Luu

[57] ABSTRACT

A directory assistance method and system to provide directory assistance information to users at computer terminals without operator assistance. The directory assistance information is requested in a computer protocol and converted to a telephone protocol, then the retrieved from a telephone data base.

8 Claims, 1 Drawing Sheet

SYSTEM CONVERTING A REQUEST MESSAGE USING COMPUTER PROTOCOL TO TELEPHONE COMMUNICATION PROTOCOL FOR ACCESSING TELEPHONE DIRECTORY ASSISTANCE INFORMATION WITHOUT ASSISTANCE FROM AN OPERATOR

FIELD OF THE INVENTION

The present invention relates generally to providing telephone directory assistance information on demand, and more particularly, to providing directory assistance over computer networks.

BACKGROUND OF THE INVENTION

Telephone system users often desire information concerning telephone system subscribers and advertisers. This information, known as directory assistance, includes telephone numbers, facsimile numbers, street addresses, and classified advertisements.

Traditionally, users request directory assistance by telephoning an operator. The operator then accesses the information from directories maintained by the telephone company.

A recognized problem is the expense and time operators spend locating directory assistance information.

Hearing impaired users access operators through a Telecommunication Relay Station ("TRS"). The expense and time of TRS operators is likewise a recognized problem.

Currently, computer users can access computer-based directory assistance data bases maintained on computer systems. However, these telephone directory data bases are not directly connected to a telephone company's directory assistance data base. Thus, these data bases tend to be incomplete, inaccurate and out-of-date.

A recognized problem, therefore, is accessing up-to-date directory assistance information from a computer terminal.

SUMMARY OF THE INVENTION

The aforementioned problems are solved by providing computer users access to directory assistance data bases maintained by a telephone company. The computer users access the same data bases used by directory assistance operators.

In one embodiment of the present invention, a user enters a directory assistance request at a computer terminal. The computer terminal transmits the request through a computer network to a telephone network. The request is processed by a data base server attached to the telephone network. The data base server then transmits a response to the user.

In a specific embodiment of the present invention, the computer network includes the Internet.

In another specific embodiment of the present invention, the protocol converter is a signaling protocol converter available from AT&T and the telephone network is a signaling system 7 (SS7) network.

DETAILED DESCRIPTION OF THE PREFERRED EMBODIMENT

Figure 1:
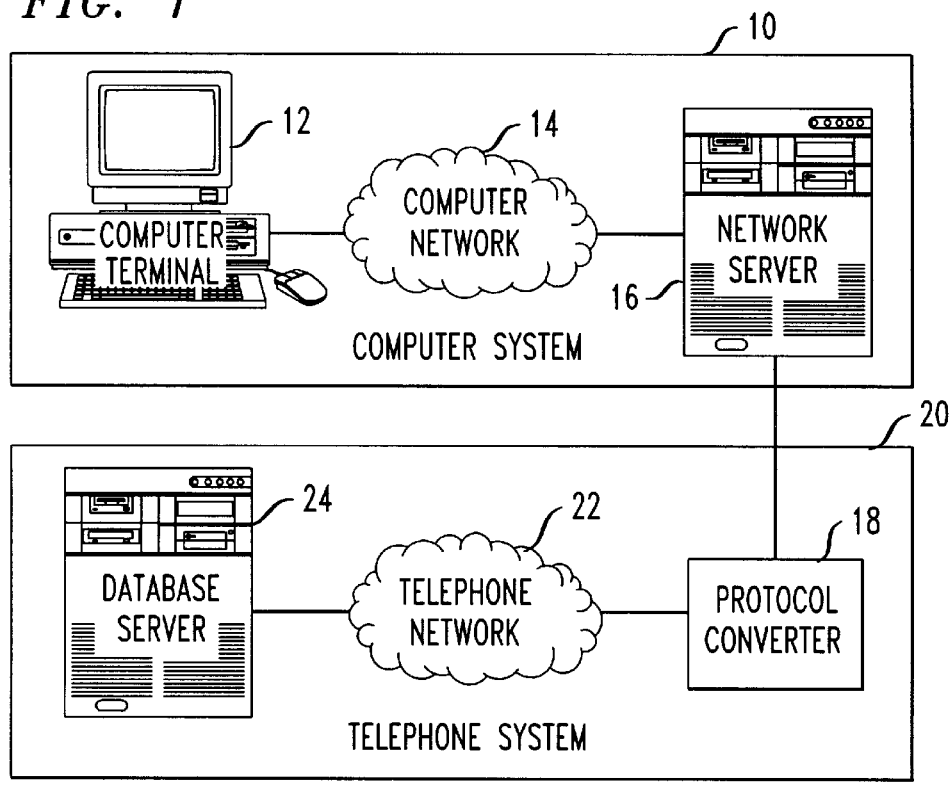
FIG. 1 is a system block diagram of a directory assistance system.

Referring to FIG. 1, a telephone system 20 receives requests for directory assistance information from a computer system 10. The telephone system 20 searches, and then transmits a response to the computer system 10.

The computer system 10 includes one or more computer terminals 12 for entering requests and receiving responses, one or more computer networks 14 connected to the computer terminals 12, and one or more network servers 16 connected to the computer network 14.

As is well known in the art, the computer terminal 12 can be any computer network compatible device including a personal computer, a laptop computer, a palmtop computer, a workstation, or a mainframe computer.

The computer network 14 transmits messages in a computer network protocol. The computer network protocols, well known in the art, include local area networks, wide area networks, and other computer networks. It is a preferred embodiment of the present invention that the computer network 14 include the Internet.

The computer system 10 can be a private computer system such as an intra-company or campus computer system. Also, the computer system can encompass a global computer system including the Internet.

The network server 16 is a computer network compatible device, well known in the art, that converts network protocols to a known communication protocol. It is a preferred embodiment of the present invention that the network server converts various network protocols to a Transmission Control Protocol/Internet Protocol ("TCP/IP").

The telephone system 20 includes one or more protocol converters 18, one or more telephone networks 22 connected to the protocol converter 18, and one or more data base servers 24 connected to the telephone network 22. The protocol converter 18 is connected to a network server 16 in the computer system 10. The data base server 24 contains directory assistance information.

The protocol converter 18 converts a known communication protocol to a telephone protocol. It is a preferred embodiment of the present invention that the protocol converter 18 be a Signaling Protocol Converter ("SPC") available from AT&T. The SPC converts messages between TCP/IP protocol and Signaling System 7 ("SS7") protocol. Such a SS7 message includes a Transactional Capabilities Application Part ("TCAP") message.

The telephone network 22, well known in the prior art, includes private branch exchanges ("PBX"), local exchange carrier ("LEC") networks, and long distance networks. If the telephone network 22 is a PBX or similar small telephone network, the telephone system 20 can be a private telephone system such as is an intra-company telephone system. A preferred embodiment of the present invention includes telephone system comprising a telephone network 22 utilizing a SS7 protocol.

The data base server 24 includes data base servers, well known in the art, currently used to provide directory assistance information to telephone operators.

Figure 2:
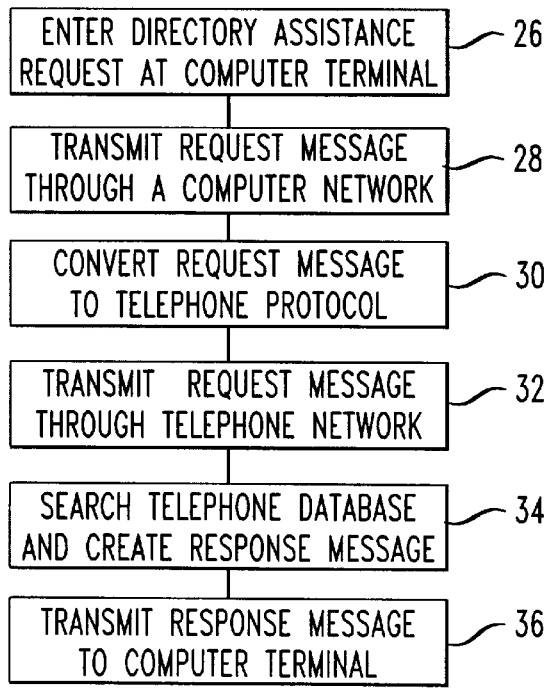
FIG. 2 is a flow diagram of the directory assistance process.

For example, referring to FIG. 2, a computer user enters a request 26 for directory assistance at a computer terminal 12 (FIG. 1). The computer terminal 12 transmits the request message 28 through the computer network 14 (FIG. 1) to a network server 16 (FIG. 1) in the network protocol. The computer terminal 12 knows the network address of network server 16 that handles directory assistance request messages. The network server 16 converts the request message from the network protocol to a protocol known to the protocol converter 18.

The protocol converter 18 (FIG. 1) receives the request message, converts the request message to a telephone protocol, and transmits the request message to the telephone network 22 (FIG. 1) in the telephone protocol 30.

The telephone network 22 (FIG. 1) transmits the directory assistance request to a data base server 24 (FIG. 1) in the telephone network protocol 32. The data base server 24 accesses the directory assistance data base and generates a response message 34.

The data base server 24 transmits the response message to the computer user 36. The data base server transmits the response message in the telephone protocol through the telephone network 22 to the protocol converter 18. The protocol converter 18 converts the response message to a network protocol and transmits it to the computer system 10. The network server 16 in the computer system 10 receives the response message, translates the response message to the network protocol, and transmits the response message to the computer terminal 12 through the computer network 14.

The request for directory assistance includes a variety of search parameters and various search types. For example, the request can be a simple request for a telephone number associated with a person or business name and address. The request can specify the type of business with only minimal additional information. The request can be a complex search using wildcard characters where the correct spelling of the names or address are not known. Likewise, the search for a specific name can retrieve names that sound similar or have similar spelling, that is a "halo" search can be performed. For example, a request includes the last name being Smith, first name being John, and the city being Washington D.C. The response message includes all phone numbers for John Smith, Jonathan Smith, and J. Smith in Washington, D.C. A halo search specifying the same criteria would return a response message with the above results and all permutations of the first or last name including "John Smiths," "Jon smiths" and "Jake Smith."

The response message includes the requested information or a notice. The requested information can be one or more entries. Notices include "notice of excessive response", "notice of null set", "notice of error", and "notice of insufficient data." The "notice of excessive response" indicates that the search is likely to return more than a specified number of responses. The "notice of null set" indicates that no information matches the request. The "notice of error" indicates that the request can not be processed. The "notice of insufficient data" indicates that the request message failed to specify enough information to form a search.

By using the directory assistance method and system described above, computer users can access telephone directory assistance information without the assistance from an operator. Likewise, the need for Telecommunication Relay Service (TRS) operators is eliminated, while still providing directory assistance services to hearing impaired computer users.

By providing computer users access to telephone data bases, computer users can access up-to-date directory assistance information.

While preferred embodiments have been shown and described, it will be understood that they are not intended to limit the disclosure, but rather it is intended to cover all modifications and alternate methods and apparatuses falling within the spirit and scope of the invention as defined in the appended claims or their equivalents.

What is claimed is:

1. A method of providing directory assistance information comprising the steps of:

(a) receiving a request message from a computer system, the request message being in a first computer protocol and specifying the desired directory assistance information;

(b) converting the request message to a telephone protocol;

(c) transmitting the request message in the telephone protocol to a telephone data base server through a telephone communication network;

(d) searching the telephone data base server for the directory assistance information;

(e) creating a response message;

(f) transmitting the response message to the protocol converter in the telephone protocol;

(g) converting the response message to the first computer protocol; and (h) transmitting the response message to the computer system in the first computer protocol.

2. The method of providing directory assistance information as recited in claim 1, wherein the step of receiving a request message from a computer system includes:

(a) entering a directory assistance request message at a computer terminal;

(b) transmitting the request message through a computer network in the computer system using a second computer protocol;

(c) converting the directory assistance request message to the first computer protocol; and (d) transmitting the directory assistance request message in the first computer protocol to a protocol converter.

3. The method of providing directory assistance information as recited in claim 2, wherein the step of transmitting the response message includes:

(a) transmitting the response message from the protocol converter to a network server in the computer system in the first computer protocol;

(b) converting the response message to the second computer protocol;

(c) transmitting the response message through a computer network to a computer terminal in the second computer protocol; and (d) displaying the response message at the computer terminal.

4. A directory assistance system comprising:

a protocol converter connected to a computer system, the protocol converter converting a request message received from the computer system from a first computer protocol to a telephone communication protocol, the request message specifying a desired directory assistance information;

a telephone communication network connected to the protocol converter; and a telephone data base server connected to the telephone communication network, the telephone data base server retrieving the desired directory assistance information in response to the request message in the telephone communication protocol to produce a telephone response message.

5. The directory assistance system as recited in claim 4 wherein the computer system comprises:

(a) a network server for converting messages between the first computer protocol and a second computer protocol, the network server being connected to the protocol converter;

(b) a computer network utilizing the second computer protocol, the computer network being connected to the network server; and (c) a computer terminal for entering the directory assistance request message and retrieving the directory assistance response message, the computer terminal being connected to the computer network.

6. The directory assistance system as recited in claim 5 wherein the computer network is connected to the Internet.

7. The directory assistance system as recited in claim 4 wherein the first computer protocol is a Transmission Control Protocol/Internet Protocol and the telephone communication protocol is a Signaling System 7 protocol.

8. The directory assistance system as recited in claim 4, further comprising the computer system.

* * * * *